United States Patent [19]

Kistemaker

[11] 4,046,527

[45] Sept. 6, 1977

[54] APPARATUS FOR THE STABLE CONFINEMENT OF AN IONIZED GAS COLUMN INSIDE A MAGNETIC FIELD

[75] Inventor: Jacob Kistemaker, Amsterdam, Netherlands

[73] Assignee: Ultracentrifuge Nederland N.V., The Hague, Netherlands

[21] Appl. No.: 440,752

[22] Filed: Feb. 8, 1974

[30] Foreign Application Priority Data

Feb. 15, 1973    Netherlands ......................... 7302102

[51] Int. Cl.² .............................................. B03C 1/00
[52] U.S. Cl. .................................... 55/100; 55/135;
  55/152; 55/154; 55/406; 55/17; 176/1; 176/3;
  176/9; 233/DIG. 1; 233/1 A
[58] Field of Search ..................... 55/3, 17, 100, 135,
  55/152, 154, 406; 233/1 A, DIG. 1; 176/1, 3, 9

[56] References Cited

U.S. PATENT DOCUMENTS

| 2,533,966 | 12/1950 | Simmons, Jr. ........................... 55/3 |
| 3,277,631 | 10/1966 | Sunnen .................................... 55/17 |

FOREIGN PATENT DOCUMENTS

| 1,359,082 | 3/1964 | France ................................ 55/100 |
| 1,363,293 | 5/1964 | France .................................. 55/3 |

Primary Examiner—Bernard Nozick
Attorney, Agent, or Firm—Cushman, Darby & Cushman

[57] ABSTRACT

Apparatus comprising a vessel provided with electrodes, magnet and cooling means designed for the stable confinement of an ionized gaseous mixture or a plasma inside a heavy gas envelope that moves at high speed along the inside of an electrically gas-repelling vessel wall. The apparatus may be used not only for bringing about thermonuclear reactions, but also for separating gases of different specific mass from one another.

8 Claims, 6 Drawing Figures

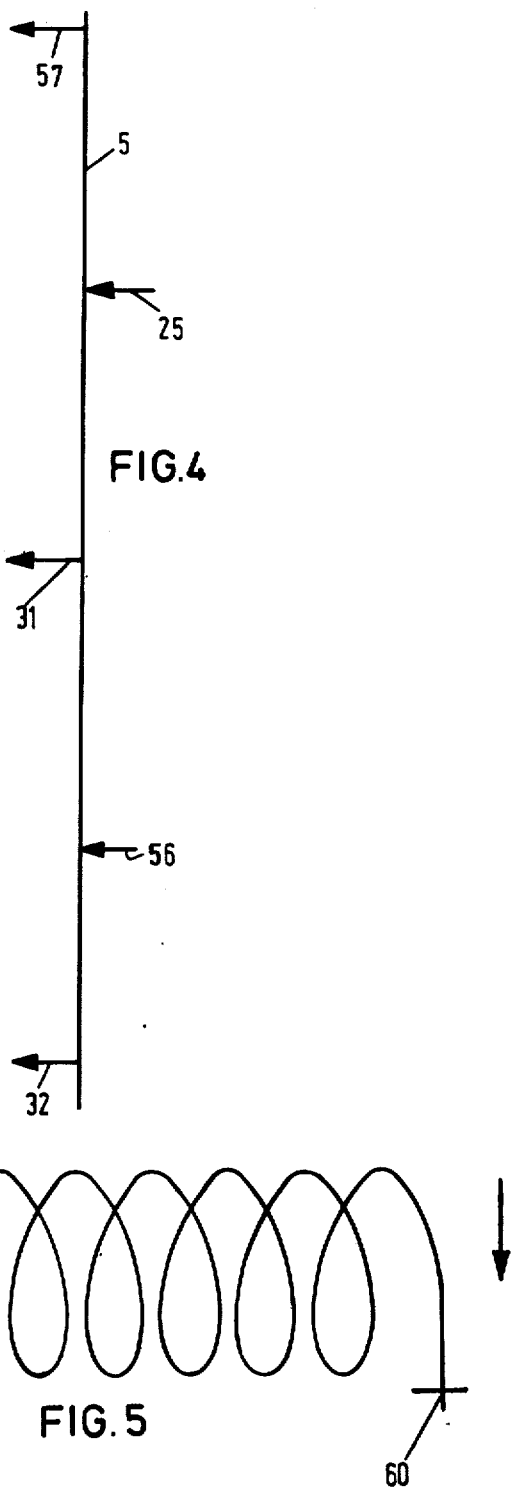

APPARATUS FOR THE STABLE CONFINEMENT OF AN IONIZED GAS COLUMN INSIDE A MAGNETIC FIELD

The invention relates to an apparatus designed for the stable confinement of a gaseous mixture, inside preferably elongated vessel, means being provided for inducing a magnetic field extending over the entire length of this vessel. More specifically, the invention aims at inducing a rapid rotation (gas whirl) in the gaseous media confined in the vessel. More specifically, the invention aims at inducing a rapid rotation (gas whirl) in the gaseous media confined in the vessel, to which end use is made of the aforementioned magnetic field as well as of an electric discharge caused by a radial potential difference between the inside wall of the vessel and the central portion thereof.

Apparatus of this nature has been known. However, efforts at keeping the ionized gaseous mass for a sufficiently long time in a stable rotating configuration have not been successful with the known apparatus. This has been found to constitute an insurmountable disadvantage in those cases where thermonuclear reactions were to be achieved.

According to the invention, such an apparatus is so designed that the light component of the gaseous mixture is contained as an ionized gas column inside an envelope of heavy gas which is pressed by forces of rotation against the inside wall of the preferably cylindrical or toroidal, cooled vessel, which is provided with at least one supply pipe for the gaseous mixture which fills the vessel and pipes for the discharge of components of this mixture of gases as well as with supply and discharge pipes which communicate with the ionized gas column, means being provided for inducing an axial magnetic field extending over the entire length of the vessel, in such a way that the gases contained therein are subjected to this field, an electrical gas discharge furthermore being maintained in the central portion of the vessel, and a radial electric potential difference being maintained between the ionized gas discharge column and the coaxial inside wall of the vessel which serves as cathode.

With the use of the above design, the ionized gas column is indeed confined in a stable manner inside the gas envelope which moves at high speed along the inside wall of the confining vessel. Not only is it thus possible to achieve greatly extended periods of confinement, but the possibility has also been created of attaining this with the aid of magnetic fields which do not have to possess such extremely high values as used to be required for confining devices according to earlier proposals.

In order to prevent a short circuit in the gas whirl described from developing at the ends of the confining vessel, this vessel is so designed that the gaseous mass contained therein is bounded near each vessel end by the disc-shaped, electrically insulating surface of a rotor which is rotatable about the local central axis of the elongated vessel. Since these rotors rotate in the same direction and at the same speed as the gases confined inside this vessel, no mechanical retardation of this gas rotation takes place at the vessel ends. It has been found experimentally that all parts of this gaseous mass rotate at the same angular velocity.

Since the disc-shaped surfaces facing the gaseous mass are electrically insulating, it is not possible for electrical short-circuiting to take place from the cathode-constituting inside wall of the vessel to the ionized core of the aforementioned gas column. Accordingly, mechanical as well as electrical short-circuiting is prevented by the rotor discs described.

A very substantial improvement of the confinement apparatus described is brought about by designing the cathode inside wall of the vessel in such a way that it comprises a number of electrically conducting parts, the inwardly extending ends of which exhibit a transverse section which approaches zero. Such a cathode wall can be built up, for example, of a number of flat rings having the form of lamellae, the inside edge of each ring being sharp in the manner of a knife, between which rings spacers are arranged which in most cases will have the form of short cylinders the diameter of which corresponds to the vessel diameter. It is also possible to arrange a large number of sharply pointed needles upon the cathode wall.

The sharp ends of all these needles, tips or lamellae must be positioned on an imaginary boundary surface, also called quasi-surface. This surface is coaxial with the cylindrical inside wall of the vessel. As a result of a kind of corona phenomenon, which can occur near each point of a sharp tip or knife edge, electrons can be ejected in certain conditions from these sharp ends. This corona phenomenon, where required, can cause a gas discharge to be maintained if a sufficiently intense electric field is applied. Another very important function of the sharp ends described is that the rapidly rotating gas cannot come into contact with the actual solid cathode wall. This is a very fortunate circumstance, since this contact would cause such a high friction that the gas would come to a stop at the wall, as a result of which turbulent whirls would set up between wall and rapidly rotating gas which could interfere with the rotation of the ionized gas column at a constant angular velocity, while, furthermore, an insurmountably high amount of energy would be required for maintaining the rotating gas whirl. With respect to viscous friction, the quasi-wall is hardly present at all for the rapidly rotating gas. In the inwardly open wall cells located between the successive lamellae, a very gradual transition takes place from the high speed of rotation at the quasi-wall to the speed of rotation 0 at the solid wall of the cathode cylinder. The above will have made it clear that the heavy gas layer at the quasi-wall virtually has a repellent effect upon the central rotating plasms or ionized gas mixture, in such a way that this is not retarded in its motion. As a result, the pressure build-up in the rotating gas mixture can take place undisturbed.

According to a variant, the inside wall of the vessel can also be lined with a number of successive, electrically conducting, mutually connected gratings with a high permeability for gas amounting to at least 90 percent, which gratings are preferably made of a highly temperature-resistant material, preferably tungsten. These successive gratings bring about an optimum damping of the speed of gas rotation inside the space between the quasi-wall and the inside wall of the vessel. By correctly dimensioning these gratings as well as their mutual successive distances, the damping curve of the gas speeds can be so attuned that linearity is ensured as much as possible.

It also is possible to maintain an electric high-frequency gas discharge in the central column of light gas with the aid of a high-frequency coil (radio frequency = R.F.) which is fitted about the vessel. The vessel wall in that location is preferably made of electrically insulating material. The advantage to be obtained with this gas discharge is that both the energy input and the electron temperature are lower than in other forms of gas discharges.

According to a further measure, the vessel is so designed that at least three connections for the gas which is contained in the gas envelope divide the length of the vessel into at least two substantially equal-sized parts, and that a supply connection is arranged between a pair of successive discharge connections. This makes it possible for the envelope gas to be circulated in a specific manner along the vessel wall, with the use of driving methods to be further explained in the following.

In certain cases it can be advantageous for the ends of the vessel to be in open connection with each other. The elongated vessel is inside closed within itself like a ring, in such a way that this vessel may be given the shape of, for example, a torus. This design is acceptable if the torus is made with a very large radius of curvature of the central axis, so that the difference between a cylindrical vessel and a curved vessel becomes negligible. In this case, the advantage is obtained that the rotors described hereinbefore, which must prevent short-circuiting phenomena from appearing at the ends of the vessel, have become superfluous.

However, if it is desired to use these rotors, it is advisable to design the vessel in such a way that the same type of rotor can be used for both vessel ends. Since such a rotor can best be fitted in such a way that the bearing supports the rotor on the underside, a practical solution consists in bending the elongated vessel in such a way that both ends are vertically directed downwardly, i.e. in the direction of gravity or of another accelerative force. In that case, the intermediate portion of the elongated vessel should be bent over at least once, for example in the form of a hairpin. It is also possible, however, to give the vessel a number of windings, in other words, to coil it, as it were, so as to be able to accommodate the great vessel length within a limited space.

As has been indicated in the above, it can be desirable to cause the so called blanket gas to circulate in a specific manner between supply and discharge connection inside the confining vessel. This can be accomplished electrically in a simple manner, in such a way that a supply connection ends into the vessel near a part of the cathode wall or electrode ring, which part or which ring may or may not be electrically insulated from the adjoining parts of this cathode wall. The successive electrode rings are alternatively given a slightly higher and a slightly lower potential, respectively, with respect to the potential of the rest of the cathode wall.

As compared to the otherwise constant angular velocity of the rotating gaseous mass along the cathode wall, a slightly higher and a slightly lower speed of rotation, respectively, are now brought about at the location of the auxiliary electrode rings. As a further result, this difference will automatically cause a circulation whirl to be adjusted in longitudinal direction, so that the blanket gas starts moving just along the inside wall of the vessel in axial direction from an electrode ring at which a slightly faster gas rotation prevails towards an electrode ring where a slightly slower rotation is present. On a somewhat smaller diameter, this flow of gas will then move in the opposite direction, causing the axial whirl to be closed.

It is serviceable to design the rotors which may be considered for use in the vessel in such a way that a rotor at the same time is constructed like a rotor of an electric motor. The rotor then receives the form of a sleeve which is shut off on the side of the disc-shaped electrically insulating surface, this sleeve enclosing from above a stationary bearing column which supports on the free end a dampingly arranged bearing cup, the damping material of which preferably consists of an elastically compressible solid substance or of a liquid.

A highly compact construction is obtained in this manner, of which the substantially cylindrical part of the sleeve can be used as the electric rotor part. The rotor sleeve is provided on the inside of the end face with a pivot pin, the end of which rests in the aforementioned bearing cup. Since lubricant vapors must not be allowed to penetrate into the gas space of the confinement vessel, the cylindrical outside surface of the bearing column is provided with helical groove which cooperates with the closely adjoining inside surface of the rotor sleeve. This sleeve thus acts at the same time as the rotor of a molecular pump, in such a way that the pumping action is directed towards the bearing, so that vapors of lubricant are prevented from penetrating into the vessel space.

It is desirable for the mechanical stabilization of the rotor sleeve to have an axially downward force act upon the lower end thereof, i.e. in the direction of gravity or of another accelerative force. To this end, a ring with paramagnetic properties is included in the rotor sleeve in a place which is closer to the open end of the sleeve than to the end of the pivot pin, while the rest of the rotor possesses mainly diamagnetic properties. The strong magnetic fields which extend over the length of the vessel are still active near the ends where the electric motors are fitted. By selecting such materials that the aforementioned ring only possesses paramagnetic properties, the result obtained is that the forces acting upon this ring do not become so great as to be unacceptable for the bearing. A proper polarity of these paramagnetic rings can bring about the result that a downwardly directed force is consistently applied to the bearing.

The electron flow moving from the cathode wall towards the center of the vessel must be carried off at this point so as to prevent a space charge from building up. This removal takes place in such a way that an electrode is arranged through at least some of the openings provided near the center of the disc-shaped end face of a rotor, one end of which electrode removes an electron current from the center of the ionized gas column, while the other end, situated inside the rotor sleeve, causes this current to flow off through one or more sharp points or sliding contacts on the end of the bearing column. The latter is accommodated on the underside in an insulating material which finds support on the outside in the vessel wall of the apparatus.

Pipes are furthermore fitted on at least one end of the vessel for supplying the components from which the ionized gas column is formed, while one or more pipes are arranged on at least the other vessel and for discharging the gaseous product which has formed in the ionized gas column. These components can be constituted, for example, by deuterium and tritium, for the purpose of maintaining a thermonuclear reaction inside the vessel. The resultant product could be discharged in the form of helium on the other side of the vessel.

In this manner, a controlled thermonuclear reaction can be attained with the aid of the installations described in the above, the gaseous envelope, composed, for example, of xenon isotopes in mixed form, being cooled in a heat exchanger which transmits the heat to an energy generator, and conveyed back to the inlet connection for the gaseous envelope. The helium which has formed, after having been collected in so-called scoops, can likewise be discharged to a cooler in order to give off heat to an energy generator. This helium is then fed to a collecting installation for further processing.

The apparatus described in the above, however, is serviceable not merely for bringing about thermonuclear reactions, but also for separating gases of different specific mass from each other. To this end, use is made of the very high speeds of gas rotation that can be obtained with the apparatus described. The design indicated now allows the construction of separating columns of great length, thus increasing very substantially the separating output for the separation of gaseous isotopes. This increased separating output is obtained especially if an internal circulation of the envelope gases is brought about in countercurrent to themselves, in the manner as described hereinabove. In taking advantage of the separating possibilities of the apparatus described, it is so constructed that the supply connections return to a common main connection, in such a way that - from the outflow connections, successively numbered from one end 0f the vessel - the odd connections meet to form a common discharge line for one component of the gaseous envelope, while the even connections analogously meet to form a common discharge line for the other component of the gaseous envelope.

The installation described more specifically is highly serviceable for the enrichment of uranium, the gaseous envelope then being composed of a mixture of $UF_6$ isotopes, in such a way that this is separated in the envelope of the vessel into the separate isotopes thereof, while the ionized column of light gas in the core of the vessel consists, for example, of argon or neon, which is supplied at one end of the vessel, it being abstracted therefrom on the other end of the vessel through scoops. This drained argon or neon gas, also indicated as slip gas, after having been cooled, purified and possibly suppleted, can be conveyed back to the core of the vessel. The function of this slip gas is in the first place to transfer the rapid rotation induced in it with the aid electric and magnetic forces to the gaseous envelope, as a result of gas-kinetic collisions. In the second place, it is the function of this slip gas to supply ions.

Around the care of the ionized gas column, which thanks to the very rapid gas rotation in its center forms a high vacuum, is a low-pressure zone, in which a so-called luminous discharge takes place. This luminous discharge, however, does not extend to the wall of the vessel, since an exponential radial pressure build-up is formed on account of the rapid rotation of the gas. Under the influence thereof, the pressure of the gas, starting from the center of the vessel towards the inside wall, becomes progressively higher. When a certain pressure has been reached, the luminous discharge is extinguished, since the gas pressure has then become much too high for it. With the use of the high-frequency windings described in the above, another form of gas discharge develops, which must not be confused with the aforementioned continuous luminous discharge. These high-frequency windings have the effect that such a highly ionized state eventually prevails in the center of the vessel that the electric conductance at the point is comparable with superconductivity. Accordingly, with the use of high-frequency windings it is not necessary to place a materially constructed anode in the center of the vessel. In some cases, however, it can be advantage to use both a material anode and high-frequency windings.

According to a preferred embodiment of such apparatus, an anode is arranged along the central axis of the vessel in the form of a unilaterally supported tube anode which is suspended from the top cover of the vessel. In certain conditions, i.e. if it is not desired to use this tube for supplying a gas required for the separating process, it can also be given the form of a solid anode.

As has been described in the above, the disc surfaces of the rotors facing the side of the gas must be covered with an insulating layer. To this end, use may be made, for example, of quartz although other materials likewise fall under the scope of protection of the invention.

According to a preferred embodiment, the required argon or neon is used in excess. This has the advantage that a more effective form of the gas countercurrent whirl is obtained in which the $UF_6$ is entrained by the argon or neon. In this manner, a mass diffusion process is obtained in a countercurrent whirl, but in combination with a centrifugal acceleration. In many cases, there will also be advantages in adding a quantity of helium to the argon or to the neon, especially in separating isotopes of such molecular gases as $UF_6$ which, at the elevated temperatures prevailing in the gas-separating chambers, exhibit a tendency toward cracking (dissociating). This admixed helium, because of its high thermal conductivity, will lower the temperature of the $UF_6$ or another gas which is liable to cracking to such an extent that this cracking phenomenon will mot occur at all.

Some embodiments of the invention are explained in further detail in the following figures. In these figures:

FIG. 4 is a schematic indication of the circuit of the supply flows as well as of the discharge of product and waste.

FIG. 5 is a schematic indication of an elongated vessel of the apparatus described, provided on both ends with discs driven by motors.

Figure 1:
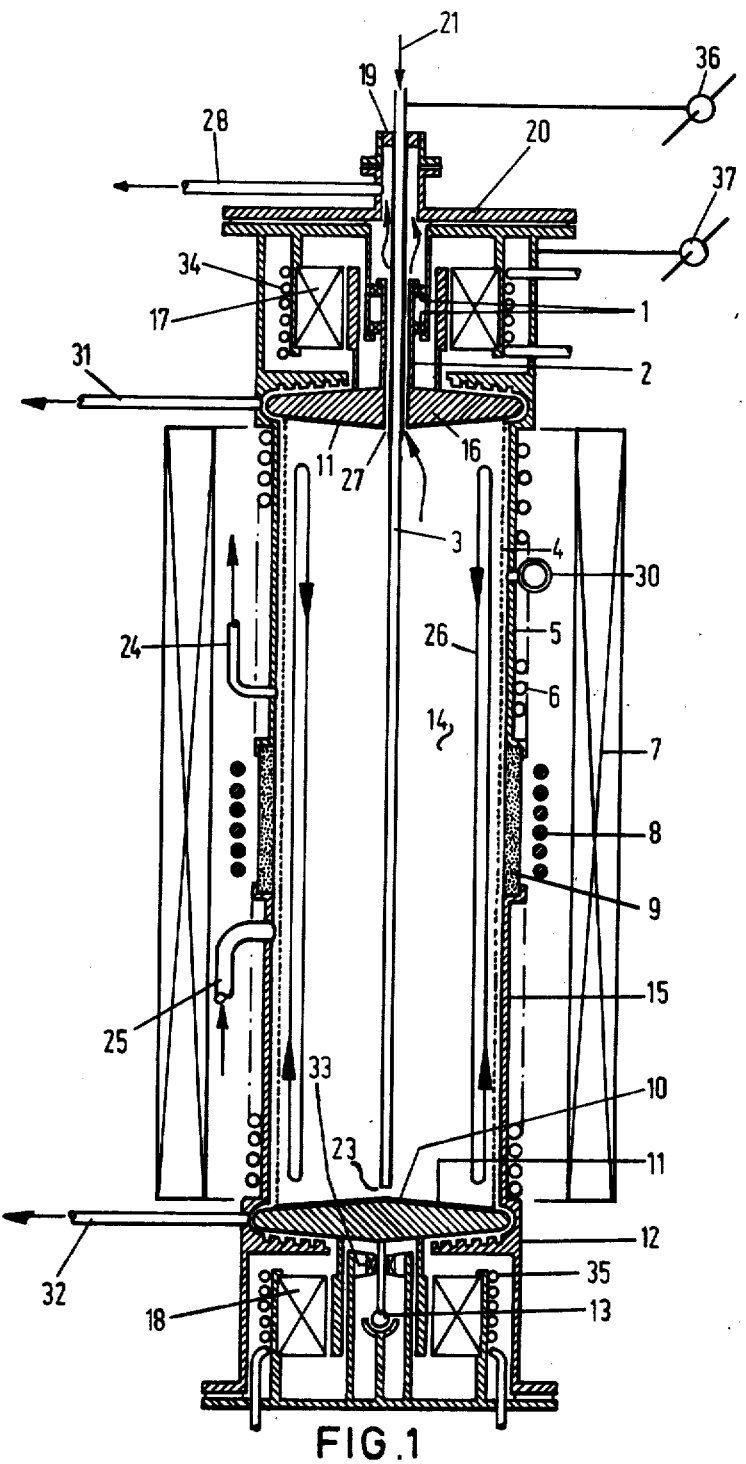
FIG. 1 is a vertical cross section of an apparatus according to the invention, which can be used for separating a gaseous mixture with light and heavy components.

In FIG. 1, the gas discharge vessel is indicated with the number 15. A separating space 14 occurs inside this vessel. The numeral 5 indicates a cylindrical outside wall, the entire inside of which bears a large number of small needles or sharp lamellae 4. A disc rotor 16 is fitted at the top of the vessel 15, and a disc rotor 10 at the bottom. These rotors are driven by electric motors 17 and 18. A cooling coil 6 is arranged against the outside of the cylindrical wall 5; the supply and discharge pipes of this coil are not shown. The cooling coil 6 consists of a hollow tube which is brought into thermally conducting contact with the outside wall. A cooling medium flows through this tube. In this manner, the heat which is generated electrically in the vessel can be dissipated. A magnet winding 7 is disposed outside the cooling coil for maintaining an axial magnetic field. A hollow anode 3, provided centrally inside the vessel 15, is introduced from the outside through an electrically insulating bushing into the vessel and is supported at the upper end in the top cover 20 by means of an electric insulator 19. 28 Is a discharge pipe for the gases contained in the ionized gas column in the center of the vessel. The outer casing of the vessel furthermore contains a number of supply and discharge connections, the pipe 24 of which can be connected to an instrument for performing such gas analyses as may be required. This instrument can be, for example, a mass spectometer. The connection 25 can be used for supplying the gas to be treated to the gaseous envelope. The number 30 indicates a pressure gauge, and the pipes 31 and 32 are intended for discharging the separate components of the gaseous envelope.

Both rotors are covered with an insulating layer 11 on the side of the vessel space 14. The number 1 indicates the bearing of the upper disc, while 13 shows a bottom-bearing in the form of a pivot-bearing, whereas an axial bearing 33 serves for keeping the rotor 10 in the vertical position. Both motors are provided on the outside of the stator with cooling coils 34 and 35. A high-frequency coil 8 with which the gas in the core of the vessel can be ionized is arranged around an insulating piece 9 which is welded into the wall 5 of the vessel. The number 12 indicates seals in the form of a visco seal which, besides serving for sealing, also allow heat to be abstracted from the disc. Such a seal can also be designated with the name Holweck seal, which can likewise be used for sealing as well as for cooling.

The operation of the apparatus shown in FIG. 1 is as follows: the gas mixture to be separated is supplied at 25 so that it reaches the gaseous envelope of the vessel 14. The core gases are here subjected to a very rapid rotation about the anode which amounts to a maximum $E \times B/B^2$, with the possibility of realizing speeds of 1000 meters/second and more. B is here the intensity of the axial magnetic field, and E the intensity of the radial electric field. At the same time, the gaseous media are subjected to a whirl motion in countercurrent, indicated by the number 26 in FIG. 1. This motion is caused by having the disc rotor 10 rotate somewhat faster than the disc rotor 16. In this manner, two currents are formed in the whirl 26, the outer flow of which rises and the inside flow being directed downwardly. The light and the heavy gaseous components are separated from each other during this process of counterflow. The heavier gaseous components are discharged through the pipe 31, while the predominantly lighter components reach the discharge pipe 32. In FIG. 1, 36 and 37 symbolize the terminals with which the potential difference between the anode 3 and the outside wall of the vessel 15 is produced.

Figure 2:
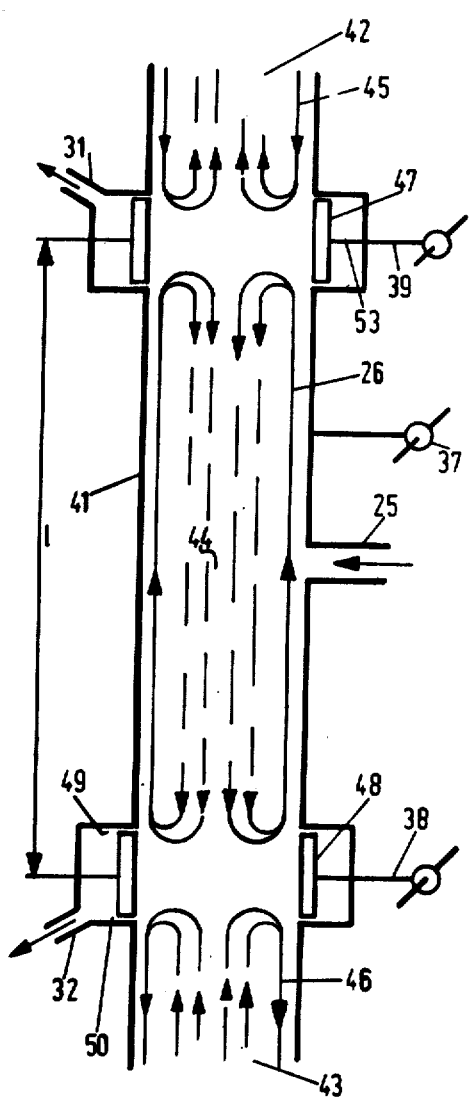
FIG. 2 is a schematic cross section of a variant of FIG. 1, in which the use of electrode rings is shown.

FIG. 2 indicates schematically that the confinement vessel 41 can be extended as required in either direction, even beyond the discharge pipes 31 and 32. The vessel compartments 42 and 43 thus formed in the extensions of the vessel are analogous to part 44 of the vessel, with the only difference that the sign of the direction of whirl circulation is reversed from section to section. Thus, the whirls 45 and 46 have a direction opposite to that of the whirl 26. This is caused by the fact that the inside wall of the vessel is interrupted by a pair of so-called electrode rings 47 and 48 which are arranged electrically insulating with respect to the rest of the vessel wall. These electrode rings, which receive their potential from the terminals 39 and 38, possess a potential difference which at 48 is somewhat lower and at 47 somewhat higher than the normal potential which is applied by the terminal 37 to the vessel wall. As a result, a somewhat greater electric current moves from the electrode ring 47 toward the central ionized core of the vessel, causing the rotation of the gases at that point to be accelerated as well. At the electrode ring 48, on the other hand, this rotation is somewhat retarded. In the manner analogous to that explained on the basis of FIG. 1, a whirl 26 is produced in the vessel compartment 44, but also oppositely directed whirls 45 and 46 in the adjoining vessel compartments 42 and 43. Such a confining vessel can be extended towards both sides over any required distance. This means that only very few rotors are required for the aerodynamic and electric termination at the vessel ends. Accordingly, the confining vessels can conceivably be given a length of several tens or hundreds of meters.

At the side of the electrode rings, as indicated for the electrode ring 48, narrow passages 49 and 50 are left open through which gas from the envelope zone of the confining vessel can be drained. Although this is not indicated in the schematic view of FIG. 2, the required sharp-ended lamellae or ditto needles naturally are again provided over the entire length of the inside wall of the vessel and likewise over the inside of the electrode rings.

Figure 3:
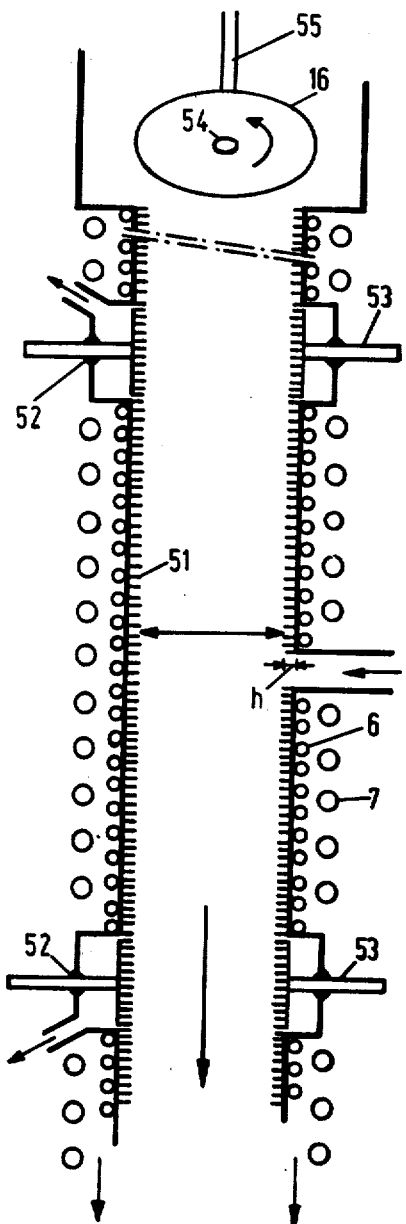
FIG. 3 is a schematic vertical cross section of a variant, where the high-frequency radiation is radiated from an end rotor into the interior of the vessel.

These lamellae or needles 51 are shown in FIG. 3, which is likewise schematic. This also applies to the insulation 52 of the electrode ring holders with respect to the vessel wall. FIG. 3 furthermore indicates that, besides a cooling coil 6, a magnet coil 7 should be provided as well. (These two coils have been omitted in FIG. 2 for the sake of simplicity). FIG. 3 furthermore indicates a schematically shown end rotor 16 which in its center has a passage 54 for a high-frequency radiation which is directed at 55 along the central axis of the ionized gas column in the core.

FIG. 4 indicates schematically how envelope gas which is to be treated can be supplied at two or more points 25, 56 to the vessel 5. Not only can tapping take place at points 31 and 32, but at 57 as well.

FIG. 5 shows in what way a highly elongated vessel 58, here indicated in linear form, can be so wound that the ends 59 and 60 can be arranged with the axes directed vertically. In this case, the rotors can be of identical construction, as shown in further detail in FIG. 6.

Figure 6:
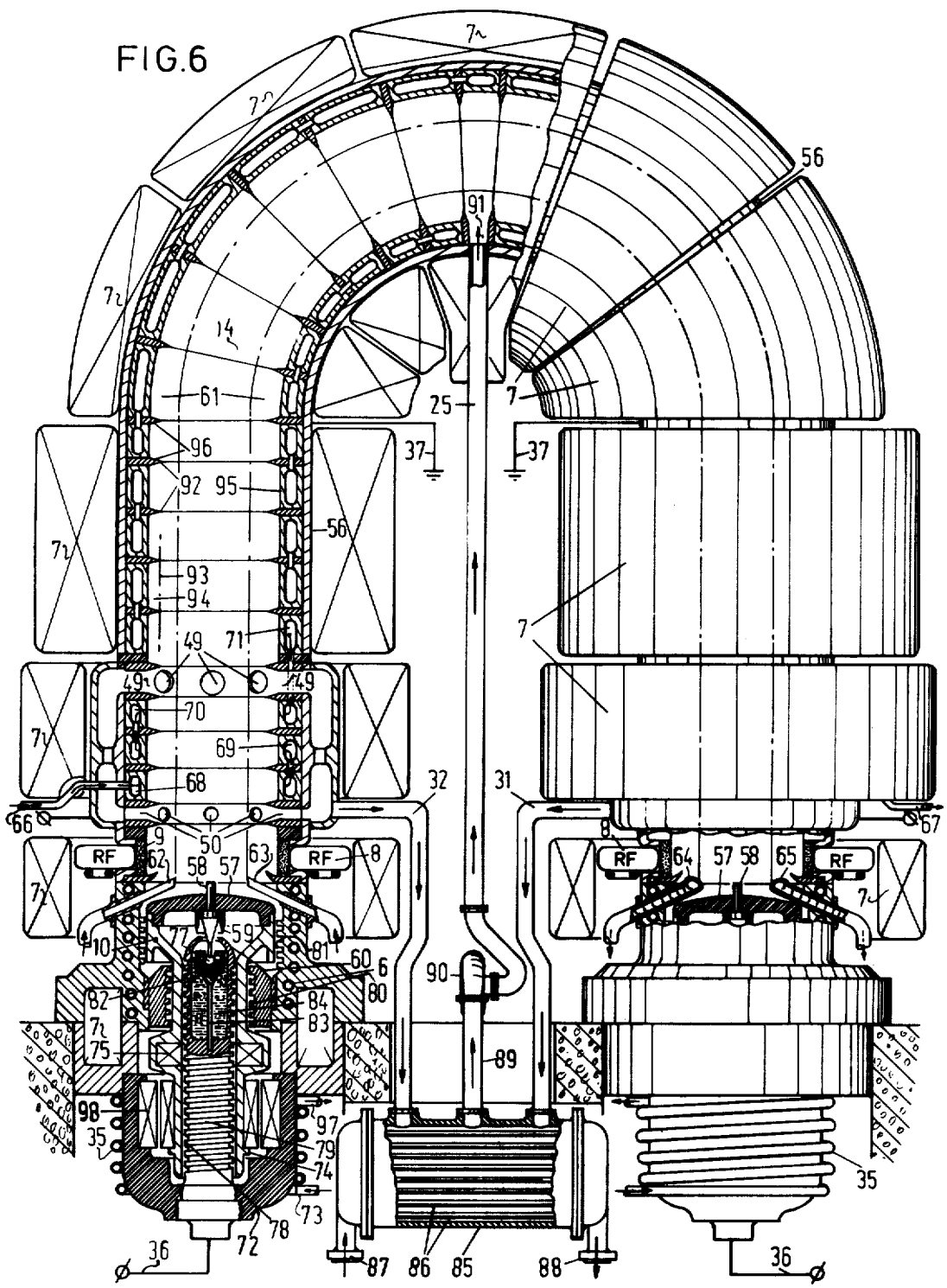
FIG. 6 is a partial view and a partial vertical cross section of an apparatus according to the invention which is suitable for carrying out thermonuclear reactions.

FIG. 6 shows a partial view and a partial vertical cross section of a containment vessel 56 designed for performing thermonuclear reactions. In this embodiment, the elongated containment vessel is not wound as according to FIG. 5, but merely bent over in the manner of a hairpin, rotors 10 being arranged at both ends and being provided on the upper side with a cap 57 of insulating material. Through this cap, an electrode 58 protrudes, which can discharge the electron current form the core zone of the confining vessel, so as to convey this by way of the tips 59 to the upper side of the bearing column 60, which is connected on the lower side to the electric conductor 36. Between 36 and 37 there again prevails the potential difference mentioned in the above.

For numerous components, the same reference numbers are used in FIG. 6 as were used in the preceding figures, so that they require little further explanation. The zone of the gaseous envelope in FIG. 6 is marked 61; the zone which is contained inside this, 14, is constituted by the ionized gas column. For ionization of this column, use is again made of windings 8, which radiate a high-frequency energy through the wall portion 9 into the vessel. Deuterium can be fed to the central gas column 14 through the supply pipe 62, and tritium through the pipe 63. The helium which has formed can be discharged at the other end of the confining vessel through the scoops 64 and 65. This helium will first have to flow through a cooler, not shown, where useful heat for the generation of energy can be given off to a separate cycling process. The number 66 indicates a supply pipe for cooling agent, which successively flows through the inside of the cooling rings 68, 69, 70 and 71, whereupon it is discharged at 67. A cooling coil 35 is also arranged around the electrically insulating motor housing 72, with a supply 73 and an outlet 97 for the cooling medium. Inside this motor housing, an electric motor 98 is accommodated which drives the casing 74 of the rotor 10 of the electric motor. Inside this casing, a ring 75 of paramagnetic material is arranged. The magnetic poles of this ring are so aligned that the magnetic field induced by the coils 7 applies a not too great, downwardly directed force to the left motor as well as to the right motor, so as to stabilize the vertical position of the motor sleeve 74. The latter fits with a small clearance around the bearing column 79 which is provided with a helical groove 78 on the outside, causing so-called molecular sealing to be produced. This results in the formation, between the inside wall of the sleeve 74 and the outside wall of the bearing column 79, of a so-called Holweck pump, causing any molecules of the lubricant used in the bearing which supports the pivot ball 77 to be forced back upwardly, so that they are prevented from getting into the confinement space of the vessel. Similar Holweck seals are provided at 80 and 81.

The pivot ball 77 of the bearing rests in a bearing cup which is supported by a bearing socket 82 that rests upon a springly bar 83 capable of permitting lateral deflection of the bearing. The space around the bearing is filled with a damping material 84, which can be a liquid but may also be a resilient solid substance.

The gaseous envelope, consisting of a mixture of argon or neon, helium, tritium, deuterium with a heavy gas such as xenon or a heavy molecule such as $UF_6$, is discharged from the containment vessel through the pipes 32 and 31, and supplied to a heat exchanger 85. In this heat exchanger, it flows around the pipes 86 which are internally traversed by a cooling agent that is fed into this heat exchanger at 87 and removed from it at 88. This heated cooling medium can be used for generating energy in a circuit, not shown, which includes the heat exchanger by way of the connections 87 and 88. The flows of gas supplied through the pipes 31 and 32 become combined in the space around the aforementioned pipes 86, whereupon they leave the heat exchanger in the form of a mixture through the pipe 89. This gas mixture, having passed through a gas pump, fan or compressor 90, is finally supplied again through the pipe 25 to the containment vessel. From the supply mouth 91, it is again distributed to the left and to the right over the envelope zones 61, whereupon it passes again through the openings 49 and 50 for discharge to the pipes 31 and 32, so that the circuit of envelope gas is thus closed.

The sharply finished lamellae 92 covering the inside wall of the confining vessel are shown in FIG. 6 at a much greater distance from each other than will be necessary in actual practice. The number 93 indicates the course of the so-called quasi-wall which allows the rapidly revolving gas column to rotate with little friction. Inside the cells 94 -- formed between a part of the quasi-wall 93, the inside wall of a cooling ring 95 and the flanks 96 of the lamellae -- the gas speed of the gaseous envelope is gradually reduced to the speed 0 near the wall 95.

I claim:

1. Apparatus for the stable confinement of a fast rotating gaseous mixture of heavy gas component and a light gas component comprising: an elongated vessel having a wall of circular cross section; means for cooling the vessel; at least one supply pipe for supplying a gaseous mixture of heavy and light components to the interior of the vessel; means spaced from the vessel wall for imparting rapid rotation to the gas in the center of the vessel so that the heavy gas component, by means of a high pressure gradient caused by centrifugal forces, moves to the inside of the vessel wall and so that the light gas component forms a central gas column extending axially in the vessel, means in said vessel for ionizing the gas column, means about said vessel for inducing an axial stationary magnetic field extending the length of the vessel so that the gas in the vessel is subjected to the field, and means within the vessel including an electrode electrically insulated from and adjacent the vessel wall for producing a radial electrical potential between the ionizing means and the vessel wall by rendering the gas column anodic and the vessel cathodic; means for flowing the heavy gas component in the form of a gas column axially along the vessel wall and then a gas column axially in an opposite direction, discharge pipes adjacent the ends of the vessel for separately removing the heavy and light component respectively.

2. Apparatus as in claim 30 including at each end of the vessel a rapidly rotating body of gas in contact with the gas in the vessel.

3. Apparatus as in claim 1 including at each end of the vessel a rotor mounted for rotation about the axis of the vessel and having a disc-shaped electrically insulating surface in contact with the gas in the vessel.

4. Apparatus as in claim 1 wherein the inside of the vessel wall includes a plurality of sharpened projections extending radially inwardly.

5. Apparatus as in claim 4 wherein the projections are formed by a plurality of flat rings coaxial with the vessel wall and having knife-edged inner edges, said rings being axially spaced apart by cylindrical spacers.

6. Apparatus as in claim 1 wherein there are two discharge pipes spaced apart along the length of said vessel and one supply pipe intermediate said discharge pipes in a location such that the length of said vessel is divided into two substantially equal parts.

7. Apparatus as in claim 6 wherein one of said discharge pipes connects with said vessel at the location of said electrode.

8. Apparatus as in claim 7 wherein there are at least two electrodes spaced along the length of said vessel, each of said electrodes being in the form of a ring concentric with said vessel and wherein one electrode possesses a slightly higher potential and the other possesses a slightly lower potential with respect to the wall of said vessel.

* * * * *